United States Patent [19]

Petersen et al.

[11] 4,284,732
[45] Aug. 18, 1981

[54] HALOGEN-CONTAINING UNSATURATED BIS-ESTERS AND POLYMERS AND COPOLYMERS BASED ON THESE ESTERS

[75] Inventors: Egon N. Petersen, Neukirchen-Seelscheid; Norbert Vollkommer, Troisdorf; Georg Blumfeld, St. Augustin; Hermann Richtzenhain, Much-Schwellenbach; Wilhelm Vogt, Cologne, all of Fed. Rep. of Germany

[73] Assignee: Dynamit Nobel Aktiengesellschaft, Cologne, Fed. Rep. of Germany

[21] Appl. No.: 59,091

[22] Filed: Jul. 19, 1979

Related U.S. Application Data

[60] Continuation of Ser. No. 815,464, Jul. 13, 1977, abandoned, which is a division of Ser. No. 780,577, Mar. 23, 1976, Pat. No. 4,149,008.

[30] Foreign Application Priority Data

Mar. 26, 1976 [DE] Fed. Rep. of Germany ....... 2612843

[51] Int. Cl.$^3$ ..................... C08L 67/06; C08F 222/20
[52] U.S. Cl. ........................... 252/609; 260/DIG. 24; 525/445; 526/75; 526/292; 526/271
[58] Field of Search ................ 526/292, 313; 525/445, 525/10, 40, 36

[56] References Cited

U.S. PATENT DOCUMENTS

| 3,277,053 | 10/1966 | Hill | 526/292 |
| 3,770,811 | 11/1973 | Lee, Jr. | 526/313 |
| 3,932,321 | 1/1976 | Maki | 526/292 |
| 4,059,618 | 11/1977 | Blumenfeld | 560/221 |

FOREIGN PATENT DOCUMENTS

49-69788  7/1974  Japan ....................... 526/292

*Primary Examiner*—C. A. Henderson
*Attorney, Agent, or Firm*—Sprung, Felfe, Horn, Lynch & Kramer

[57] ABSTRACT

Halogen-containing bis-acrylates and bis-methacrylates corresponding to the formula

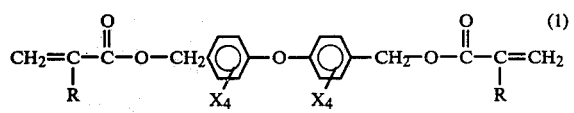

in which R represents hydrogen or a methyl group and X represents chlorine and/or bromine, are provided as well as a process for producing such compounds. The compounds are useful for the formation of polymers and copolymers and as cross-linking agents. Also included in the invention are the polymers and copolymers based on the above-described halogen-containing bis-acrylates and bis-methacrylates, methods for the production of said polymers and the use of said polymers as flame proofing agents, etc.

9 Claims, No Drawings

HALOGEN-CONTAINING UNSATURATED BIS-ESTERS AND POLYMERS AND COPOLYMERS BASED ON THESE ESTERS

This application is a continuation of Ser. No. 815,464, filed July 13, 1977, now abandoned, which in turn is a divisional of Ser. No. 780,577, filed Mar. 23, 1976, now U.S. Pat. No. 4,149,008.

BRIEF SUMMARY OF THE INVENTION

This invention relates to bis-acrylates and bis-methacrylates corresponding to the formula

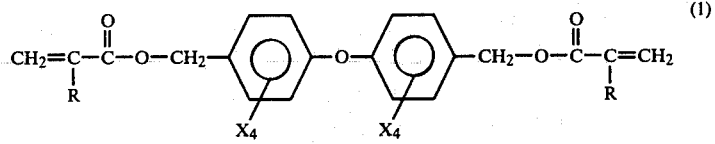
(1)

in which R represents hydrogen or a methyl group and X represents chlorine and/or bromine, and to a process for producing these compounds.

The invention also relates to polymers based on compounds of formula (1), to their production and to their use as flameproofing agents.

The unsaturated esters are produced by reacting 4,4'-bis-chloromethyl octahalodiphenyl ether, wherein the halogen atoms are either chlorine or bromine, e.g. 4,4'-bis-chloromethyl octachlorodiphenyl ether or 4,4'-bis-chloromethyl octabromodiphenyl ether with the alkali metal salts of acrylic acid or methacrylic acid in polar solvents which are miscible with water to a small extent at least.

The unsaturated esters according to the invention are produced in accordance with the following formula scheme which relates by way of example to the bromine-substituted bis-acrylate:

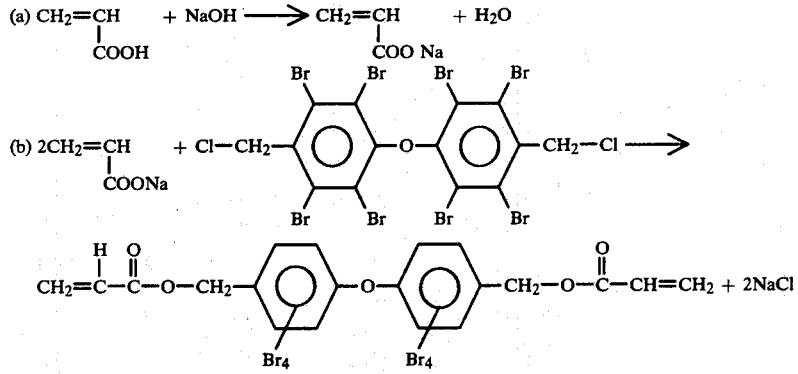

The compounds according to the invention preferably contain eight halogen substituents distributed between both aromatic rings, only bromine substituents or chlorine substituents or mixed bromine and chlorine substitution being possible. In addition to bromine substituents on the aromatic nuclei, mixtures containing from 6 to 8 and more especially from 7 to 8 bromine substituents and from 2 to 0 and more especially from 1 to 0 chlorine substituents are very suitable for the synthesis of flameproofing agents. It is possible for less than eight halogen substituents to be present per molecule, for example 7 halogen substituents, although this is not preferred.

In the starting materials, a small proportion of the chlorine in the chloromethyl groups may be replaced by bromine, although this is also not preferred.

In a polar organic solvent, the unsaturated carboxylic acids are converted into the alkali metal (e.g. sodium or potassium etc.) or ammonium salts by the addition of, for example, alkali metal alcoholates, alkali metal hydroxides, alkali metal carbonates or bicarbonates or tertiary amines. Of the alkali metal compounds, the hydroxides are particularly preferred. They are generally added in the form of aqueous solutions.

Thereafter, 4,4'-bis-chloromethyl octahalogen diphenyl ether is added to a stoichiometric excess of from about 1 to about 10 mole % of the alkali metal salt of the unsaturated carboxylic acid and reacted at about 70° to about 150° C. in the presence of a polymerisation inhibitor to form the bis-ester.

Salt formation between the (meth)acrylic acid and alkali metal hydroxide is generally carried out at room temperature, an aqueous, preferably about 50% alkali metal hydroxide solution being added with stirring to the acid initially introduced in the solvent following the addition of the polymerisation inhibitor.

After the 4,4'-bis-chloromethyl octahalogen diphenyl ether has been introduced, the reaction mixture is heated to the reaction temperature of from about 70° to about 150° C., preferably from about 90° to about 130° C., and left to react until a substantially complete conversion is obtained. The reaction time is between about 0.5 and about 5 hours and preferably between about 1 and about 3 hours. The progress of the reaction may be followed by quantitatively determining the alkali metal chloride formed, for example by Mohr's chloride determination. Examples of suitable polar solvents for use in the production of the unsaturated bis-esters of formula (1) with X=chlorine are alcohols, particularly alkanols, with 2 to 4 carbon atoms, glycols (e.g. ethylene and propylene glycol), glycol ethers (e.g. ethylene glycol monomethyl or monoethyl ether), ether alcohols, cyclic ethers such as tetrahydrofuran and dioxane, dimethoxy ethane, dimethyl formamide, diethylformamide dimethyl acetamide, diethyl acetamide, N-methyl or N-ethyl pyrrolidone and dimethyl or diethyl sulphoxide. Ethylene glycol monomethyl ether is preferably used.

Examples of polar solvents suitable for use in the production of the unsaturated bis-esters of formula (1), with X=bromine, are dimethyl or diethyl formamide, dimethyl or diethyl acetamide, N-methyl or N-ethyl pyrrolidone, hexamethyl phosphoric acid triamide and dimethyl or diethyl sulphoxide. N-methyl pyrrolidone is preferably used.

Suitable inhibitors are hydroquinone, p-benzoquinone, pyrocatechol, 4-tert.-butyl pyrocatechol, hydroquinone monomethyl ether, 2,4,6-tri-tert.-butyl phenol. Hydroquinone is preferably used.

NaOH or KOH is preferably used as the salt former.

The stoichiometric excess of about 1 to about 10 mole % of the alkali metal acrylate or methacrylate in relation to the bis-chloromethyl octahalogen diphenyl ether is intended to guarantee a complete conversion of this latter starting product. The excess quantities of alkali metal acrylate or methacrylate may readily be separated off together with the alkali metal chloride formed when the reaction mixture is worked up.

Alkali metal hydroxide and unsaturated acid may be used in equivalent quantities. However, it has proved to be of advantage for preventing the formation of undesirable secondary products, such as polymers which are formed by vinyl polymerisation during the actual esterification reaction, to use the unsaturated acid in a slight stoichiometric excess relative to the salt former so that the reaction mixture shows an acid reaction both during and after salt formation. In this way, the phenolic inhibitor adequately develops its effect.

On completion of the reaction, the reaction products are in solution except for the alkali metal chloride and small amounts of the bis-acrylates or bis-methacrylates already crosslinked by polymerisation. The undissolved products can be separated off by filtration or centrifuging. When the filtrate is cooled, the bis-esters of formula (1), with R=H, generally crystallise out in high yields and in sufficiently pure form. They are separated off, washed with water until free from chloride and preferably dried at room temperature. To isolate the ester, the reaction solution may also be poured into water, preferably after the fractions undissolved in the heat have been separated off, and the reaction products isolated in this way. This procedure is recommended for the bis-methacrylic esters which crystallise out somewhat more sluggishly and incompletely.

The invention also relates to polymers and copolymers based on the unsaturated bis-esters of formula (1), containing basic units with the structure

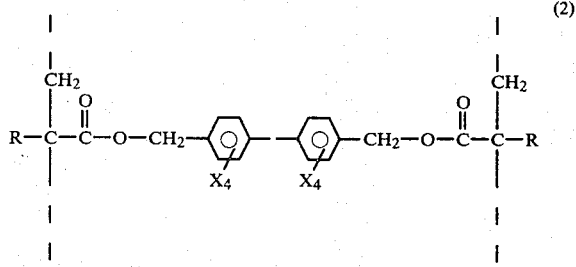

in which R and X are as defined above, and to a process for the production of polymers and copolymers by the radical polymerisation of ethylenically unsaturated compounds, wherein monomers of formula (1) are polymerised optionally together with other ethylenically unsaturated monomers and optionally after forming or shaping.

The halogen-containing unsaturated bis-esters of formual (1) according to the invention may be subjected to crosslinking polymerisation or may be used as comonomers or as reactive crosslinkers for unsaturated, copolymerisable compounds.

By virtue of the polyfunctionality of the unsaturated bis-esters of structural formula (1), crosslinked insoluble homopolymers or even copolymers are obtained. The polymerisation mechanism both for homopolymerisation and also for copolymerisation is preferably radical, although polymerisation may also be anionically initiated. Suitable radical formers are organic or inorganic peroxides or aliphatic azo compounds. It is preferred to use dibenzoyl peroxide, dicumyl peroxide or potassium peroxy disulphate and also azodiisobutyronitrile. The radical formers may be decomposed thermally, by high-energy radiation or by a redox reaction. The usual polymerisation temperatures, generally in the range from about 0° C. to about 150° C., may be applied. Polymerisation may also be initiated purely thermally, i.e. without adding an initiator.

Suitable comonomers for producing the copolymers are ethylenically unsaturated monomers copolymerisable with the unsaturated bis-esters of formula (1), especially styrene, acrylonitrile, acrylic acid esters and methacrylic acid esters preferably containing 1 to 6 carbon atoms in the alcohol radical, unsubstituted and chlorine-or bromine- substituted benzyl acrylates and methacrylates, unsubstituted and chlorine- or bromine-substituted xylylene-bis-acrylates or bis-methacrylates, butadiene and isoprene, fumaric and maleic acid or their anhydrides, their esters and, optionally, even vinyl chloride, vinylidene chloride and others. The polymerisation of several comonomers to form terpolymers is also possible. Preferred comonomers are styrene, acrylic acid and methacrylic acid esters and also esters and polyesters of fumaric and maleic acid. The latter comonomers are produced by hardening solutions in styrene of unsaturated polyester resins based on diol components, such as ethylene glycol or neopentyl glycol, unsaturated acid components, such as fumaric or maleic acid, and optionally additional saturated dicarboxylic acid components, the unsaturated bis-esters of formula (1) also being included in the crosslinking copolymerisation of the fumaric or maleic ester double bonds with styrene.

The polymerisation of the bis-esters of formula (1) according to the invention and their copolymerisation with the above-mentioned monomers may be carried out in bulk, in solutions or in suspension.

Since bulk homopolymerisation or copolymerisation results in the formation of crosslinked, infusible products, it is best carried out after shaping or forming.

Homopolymerisation or copolymerisation in solution can give either solvent-free powder-form products or solvent-containing, swollen polymer gels, depending upon the type of solvent used and, in the case of copolymerisation, upon the type of comonomer used.

In cases where it is desired to produce bis-(meth)acrylates crosslinked by full polymerisation, there is no need for synthesis of the monomers of structural formula (1) from acrylic or methacrylic acid and 4,4'-bis-chloromethyl octahalogen diphenyl ether and the subsequent crosslinking radical polymerisation reaction to be carried out in separate apparatus. Both the ester-forming condensation reaction and also the polymerisation reaction may be carried out in a "one-pot reaction" without isolating or purifying the intermediate product of formula (1). The crosslinked polymer, which precipitates in insoluble form, is filtered off under suction, washed with organic solvent and then with water until it is free from chloride and dried.

It is extremely remarkable that the crosslinked polymers can be directly produced from the bis-chloromethyl compound in a single operation merely by adding the polymerisation initiator and, optionally, a solvent to the monomer in its solution, followed by further heating. Accordingly, impurities do not interfere with the production of the monomers, nor do residues of chloromethyl groups have any effect.

Contrary to expectations, the polymers thus produced have a non-reduced molecular weight and the same property spectrum as the polymers produced from isolated and purified bis-acrylate esters and bis-methacrylate esters.

One advantage of the copolymers is their substantial or complete non-inflammability.

It is standard practice to make plastics substantially or completely non-inflammable by adding flameproofing substances to them during their processing. In general, the compounds used for this purpose bear no chemical relationship with the organic polymers which represent the plastics, such as for example halogen-containing or even phosphorus and nitrogen-containing organic or inorganic low molecular weight compounds or mixtures thereof with metal oxides which occasionally enhance one another's flameproofing effect. In addition to their flameproofing effect, additives such as these to plastics always have secondary effects which are generally undesirable because they adversely affect the characteristic properties of the plastics and limit their usefulness. Thus, flameproofing agents which are added to the plastics material in powder form and which remain intact as powders or separate out again as a separate phase, generally act not only in the required flameproofing manner, but in addition as fillers which alter the mechanical properties, generally have an embrittling effect and reduce elongation at break and impact strength.

In almost every case, the flameproofing agents added show a more or less considerable tendency to diffuse out of the plastics material again. This chalking out not only gradually deprives the plastics materials of their non-inflammability, it also means that plastics flameproofed in this way are unsuitable for numerous applications, for example in the construction of electrical installations and units.

The advantage of using the flameproof finish in accordance with the invention is that the flameproofing agent is attached to the plastics material by copolymerisation, i.e. homeopolar bonding which makes chalking out impossible. In addition, since the flameproofing agent does not have the character of a filler, the mechanical properties are not adversely affected. On the contrary, remarkable improvements are obtained, especially in dimensional stability under heat and tensile strength.

The crosslinked polymers or copolymers of the bromine-containing bis-acrylic or bis-methacrylic esters of structural formula (1) have an unusually high thermal stability for brominated organic compounds which provides for problem-free processing and for time-limited use of the polymers according to the invention at temperatures of up to 320° C. or up to 280° C. without any danger of decomposition or thermal damage.

Accordingly, the processing and service temperatures of the polymers and copolymers are with advantage above the processing temperatures of numerous plastics so that the invention opens up for flameproofed plastics temperature ranges which are inexcessible or substantially inexcessible to plastics containing conventional flameproofing agents.

The bis-acrylates and bis-methacrylates of formula (1) are also interesting components for thermosetting (radically crosslinkable) resins. In this case, it is possible to harden the bis-esters after bulk shaping or forming or even to add other acrylates, methacrylates or bis-(meth)-acrylates as reactive crosslinking component.

The unsaturated bis-esters of formula (1) may also be used with advantage as a crosslinking component of unsaturated polyester resins. During hardening, the maleate or fumarate double bonds of the UP resin react with the double bonds of the styrene and with the double bonds of the unsaturated bis-esters according to the invention by crosslinking radical copolymerisation. By including the compounds of formula (1) in the crosslinking process, valuable improvement in properties are obtained, especially in dimensional stability under heat and tensile strength, impact strength and notched impact strength surprisingly remaining intact.

It is also possible to harden styrene-free unsaturated polyester resins with the unsaturated bis-esters according to the invention, for example in the field of moulding compositions.

Homopolymers and copolymers with large contents of the compounds of formula (1) in the range from about 40 to about 99.9% and preferably in the range from about 70 to about 99.9% may be used as polymeric flameproofing agents, the gradual removal of the flameproofing agents by extraction with solvents or by migration being prevented with considerable advantage by the insolubility.

It is also possible to add the polymers of formula (2), especially those containing from about 40 to about 70% by weight and preferably from 50 to 70% by weight of bromine, as flameproofing agents to other polymers, an addition of from 5 to 25% by weight, optionally with additional quantities of $Sb_2O_3$, being advisable in this case.

DETAILED DESCRIPTION

EXAMPLE 1

Production of the bis-acrylic ester of formula (1) with X=chlorine

In a reaction vessel equipped with a stirrer and reflux condenser, 31.6 g (0.44 mole) of acrylic acid and 1 g of hydroquinone as polymerisation inhibitor are dissolved in 300 ml of ethylene glycol monomethyl ether, followed by the addition in portions with stirring of a solution of 16.8 g (0.42 mole) of sodium hydroxide in 16.8 g of water. 108.6 (0.2 mole) of 4,4'-bis-chloromethyl octachlorodiphenyl ether are then added, followed by heating for 2 hours to the reaction temperature of 110° C.

Mohr's chloride determination revealted a 97% conversion. In order to separate off small undissolved fractions, the still hot solution was filtered under suction through a glass frit. In order to complete crystallisation of the reaction product, 100 ml of water were stirred into the solution during cooling, followed by cooling to 0° C. A colourless crystalline deposit was precipitated and was filtered off under suction, washed with water until free from chloride and dried over $P_2O_5$ at room temperature.

The yield amounted to 78 g, corresponding to 65.4% of the theoretical. Another 26 g, corresponding to 21.8%, can be precipitated from the mother liquor by the addition of 400 ml of water, so that the total yield amounts to 104 g, corresponding to 87% of the theoretical. Melting point of the fraction crystallised out=124°–136° C., melting point of the precipitated fraction=105°–131° C. Recrystallisation of the former fraction from ethylene glycol monomethyl ether gives a product with a melting point of 132°–138° C. Determination of the double bond content according to Beesing revealed a purity of 98.1% for the recrystallised bis-acrylic ester.

Elemental analysis: calculated C: 39.1 Cl: 46.2; observed C: 38.8 Cl: 46.6.

EXAMPLE 2

Production of the bis-methacrylic ester of formula (1) with X=chlorine

In a reaction vessel equipped with a stirrer and reflux condenser, 94.7 g (1.1 mole) of methacrylic acid and 2 g of hydroquinone as polymerisation inhibitor are dissolved in 500 ml of ethylene glycol monomethyl ether, followed by the gradual addition with stirring of a solution of 42 g (1.05 mole) of sodium hydroxide in 42 g of water. 271.5 g (0.5 mole) of 4,4'-bis-chloromethyl octachlorodiphenyl ether are then added, after which the reaction mixture is heated for 1.5 hours to 110° C. After the removal of undissolved fractions by filtration under heat, 208 g of the required bis-methacrylic ester crystallise out from the cooled solution, corresponding to a yield of 64.8% of the theoretical. Another 62.4 g, corresponding to 19.4% of the theoretical, were precipitated from the mother liquor by the addition of 800 ml of water. The total yield is 270.4 g, corresponding to 84.2% of the theoretical. Melting point of the fraction crystallised out: 91°–102° C. melting point of the precipitated fraction: 82°–92° C. Recrystallisation of the former fraction from ethylene glycol monomethyl ether increases the melting point to 99°–104° C.

Elemental analysis: Calculated: C: 41.1 Cl: 44.2; observed: C: 40.3 Cl: 45.0.

EXAMPLE 3

Production of the bis-acrylic ester of formula (1) with X=bromine

In a reaction vessel equipped with a stirrer and reflux condenser, 76 g (1.05 mole) of acrylic acid and 1.5 g of hydroquinone as inhibitor are dissolved in 800 ml of N-methyl pyrrolidone, followed by the addition in portions of a 50% by weight aqueous solution of 41 g (1.02 mole) of sodium hydroxide. 449 g (0.5 mole) of 4,4'-bis-chloromethyl octabromodiphenyl ether are then introduced, followed by heating to the reaction temperature of 110° C. After 1.5 hours at 110° C., the conversion is substantially quantitative (Mohr's Cl determination).

After undissolved fractions have been separated off under heat, the reaction product is precipitated after cooling by the addition of water, washed with water and dried at room temperature.

430 g of the required bis-acrylic ester are obtained, corresponding to a yield of 88.8% of the theoretical. Melting point 143°–151° C., after recrystallisation from ethylene glycol monomethyl ether 146°–152° C. Determination of the double bond content according to Beesing revealed a purity of 97.6% for the recrystallised bis-acrylic ester.

Elemental analysis: calculated C: 24.7 Cl: 0 Br: 65.9; observed C: 24.5 Cl: 2.1 Br: 62.0.

The chlorine content of 2.1% which occurs at the expense of an excessively low bromine content is attributable to a limited bromine-chlorine exchange in the two nuclei during chlorination of the octabromoditolyl ether into 4,4'-bis-chloromethyl octabromodiphenyl ether.

EXAMPLE 4

Following the same procedure as in Example 3, 444 g of the bis-acrylic ester of formula (1), with X=bromine, are obtained after drying from another batch of 4,4'-bis-chloromethyl octabromodiphenyl ether (449 g=0.5 mole), corresponding to a yield of 90.8% of the theoretical. Melting point 146°–160° C., after recrystallisation from ethylene glycol monomethyl ether 158°–165° C.

Elemental analysis: calculated C: 24.7 Cl: 0 Br: 65.9; observed C: 24.6 Cl: 1.1 Br: 63.8.

The higher melting range of 158°–165° C. as against 146°–152° C. for the bis-acrylic ester according to Example 3 is attributable to the relatively slight bromine-chlorine exchange during the above-mentioned side chain chlorination process.

EXAMPLE 5

Production of the bis-methacrylic ester of formula (1) with X=bromine

In a reaction vessel of the type used for the preceding Examples, 94.7 g (1.1 mole) of methacrylic acid and 1.5 g of hydroquinone are dissolved in 650 ml of N-methyl pyrrolidone, followed by the addition in portions with stirring of a 50% by weight aqueous solution of 42 g (1.05 mole) of sodium hydroxide. 449 g (0.5 mole) of 4,4'-bis-chloromethyl octabromodiphenyl ether are then introduced, followed by heating to the reaction temperature of 100° C. After 2.5 hours at 100° C., Mohr's chloride determination reveals a 95% conversion. After a total reaction time of 3 hours, the reaction is terminated, still hot undissolved fractions are separated off by filtration and the reaction solution is cooled to 0° C. The crystal mass which has precipitated is filtered under suction, washed with water until free from chloride and dried at room temperature. 160 g of bis-methacrylate are obtained, corresponding to a yield of 32% of the theoretical. Melting point 150°–156° C. Another 176 g of bis-methacrylate, corresponding to 35.3%, can be precipitated from the mother liquor by pouring it into water. Total yield 336 g, corresponding to 67.3% of the theoretical. Melting range of the precipitated fraction: 139°–152° C. After recrystallisation of the former fraction from ethylene glycol monomethyl ether. m.p.=157°–160° C.

Elemental analysis: calculated: C: 26.4; Cl: 0; Br: 64.1; observed: C: 26.1; Cl: 2.5; Br: 61.2.

EXAMPLE 6

Following the same procedure as in Example 5, but with the temperature increased to 110° C. and the reaction time shortened to 2 hours, 170 g of bis-methacrylic ester, which crystallise out from the reaction solution on cooling and precipitation with water, are obtained from the 449 g (0.5 mole) of 4,4'-bis-chloromethyl octabromodiphenyl ether of another batch. Total yield 430 g, corresponding to 86.2% of the theoretical. Melting point of the fraction crystallised out: 164°–167° C., melting point of the precipitated fraction: 143°–159° C. Melting point after recrystallisation of the former fraction from ethylene glycol monomethyl ether: 166°–168° C.

Elemental analysis: Calculated: C: 26.4; Cl: 0; Br: 64.1; observed: C: 26.2; Cl: 1.3; Br: 62.4.

EXAMPLE 7

Polymerisation into crosslinked bis-acrylate of formula (2) with X=bromine

In a reaction vessel equipped with a stirrer, reflux condenser and gas inlet tube, 22.7 g (0.315 mole) of acrylic acid and 0.15 g of hydroquinone (to prevent premature crosslinking polymerisation in the condensation stage) are dissolved in 300 ml of N-methyl pyrrolidone, followed by the addition with stirring of a 50% aqueous solution of 12 g of sodium hydroxide (0.3 mole). 130 g (0.145 mole) of 4,4'-bis-chloromethyl octabromodiphenyl ether are then stirred in, followed by heating for 2 hours to 100° C. For crosslinking polymerisation, the solution is diluted with 150 ml of ethylene glycol monomethyl ether and, following the addition of 3 g of dicumyl peroxide as radical former, is heated to a bath temperature of 135° C. while a gentle stream of nitrogen is passed over. A dispersion of the precipitating crosslinked polymer is formed. After 2 hours, the bath temperature is increased to 140° C. and, after another hour, to 150° C. and is left at 150° C. for 1.5 hours. The crosslinked bis-acrylate is filtered off under suction, washed with water until free from chloride and dried in a drying cabinet at a temperature increasing to 160° C. 135 g of crosslinked, insoluble and infusible, powder-form colourless polymer are obtained. Its bromine content as determined by elemental analysis amounts to 63.5% and its chlorine content to 1.2%. No acrylic ester double bonds can be detected by IR-analysis. On a thermobalance (air, heating rate 8° C./minute), the crosslinked product shows the following wave losses: 1% at 309° C., 5% at 327° C. and 10% at 334° C.

EXAMPLE 8

Polymerisation into crosslinked bis-methacrylate of formula (2) with X=chlorine.

In a reaction vessel of the type described in Example 7, 44.7 g (0.52 mole) of methacrylic acid and 0.2 g of hydroquinone (to prevent premature crosslinking polymerisation in the condensation stage) are dissolved in 300 ml of ethylene glycol monomethyl ether followed by the gradual addition with stirring of a 50% aqueous solution of 20.4 g (0.51 mole) of sodium hydroxide. 135.7 g (0.25 mole) of 4,4'-bis-chloromethyl octachlorodiphenyl ether are then introduced, the temperature is raised to 110° C. and the mixture left to react for 1.5 hours.

2.5 g of dicumyl peroxide are added as polymerisation initiator while a gentle stream of nitrogen is passed over and the bath temperature is increased to 135° C. A dispersion of the precipitating crosslinked polymer is formed. After 4.5 hours, crosslinking is terminated, the crosslinked bis-methacrylate is filtered off under suction, washed with water until free from chloride and dried at up to 160° C. until constant in weight.

152 g of a crosslinked, insoluble and infusible powder-form colourless polymer are obtained. Its chlorine content amounts to 44%. No methacrylic ester double bonds can be detected by IR-analysis. On a thermobalance (air atmosphere; heating rate 8° C./minute), the crosslinked bis-methacrylate shows the following weight losses: 1% at 314° C.; 5% at 329° C. and 10% at 341° C.

EXAMPLE 9

Bis-acrylate of formula (1) with X=bromine as reaction component of a bis-acrylate resin.

A mixture of 100 g of p-xylylene-bis-acrylate (m.p. 72°–75° C.), 50 g of tetrachloro-m-xylylene-bis-methacrylate (m.p. 83° C.) and 25 g of the bis-acrylate of formula (1) according to the invention, with X=bromine (m.p. 146°–160° C.), is melted, 1.5% by weight of dicumyl peroxide is added as hardening catalyst and the melt is poured into moulds in which it is hardened for 2 hours at 120° C. and post-hardened for 2 hours at 140° C. Transparent substantially colourless 4 mm and 2 mm thick panels are produced.

The 4 mm thick panel has an impact strength of 6.2 KJ/m$^2$ and a dimensional stability under heat of 97° C. (Martens) and 113° C. according to ISO/R 75; A, International Standardisation Organisation.

The 2 mm panel is self-extinguishing in the UL/94 test in which it is given the rating VO, i.e. the best value.

For comparison, a 4 mm panel produced by the same method from a casting resin mixture, consisting of 125 g of p-xylylene-bis-acrylate and 50 g of tetrachloro-m-xylylene-bis-acrylate, shows an impact strength of 5.0 KJ/m$^2$ and a dimensional stability under heat of 89° C. (Martens) and 99° C. (ISO R 75; A). A 2 mm thick casting failed the UL/94 test.

EXAMPLE 10

Bis-acrylate of formula (1) with X=bromine as reaction component of a styrene bis-acrylate resin solution.

150 g of tetrachloro-p-xylylene-bis-acrylate (m.p. 116°–117° C.) and 50 g of the bis-acrylic ester of formula (1) according to the invention, with X=bromine (m.p. 146°–160° C.), are dissolved together in 200 ml of styrene. Following the addition of 2% by weight of a 50% dibenzoyl peroxide paste, the resin solution is poured into moulds, hardened for 4 hours at 80° C. and then post-hardened for 4 hours at 135° C. A 4 mm panel has a flexural strength of 108 N/mm$^2$, an impact strength of 7.3 KJ/m$^2$ and a dimensional stability under heat of 106° C. (Martens). A 2 mm panel is self-extinguishing in the UL/94 test, ranging: VO.

EXAMPLE 11

Bis-methacrylate of formula (1) with X=bromine as crosslinking component for methyl methacrylate.

25 g of bis-methacrylic ester of formula (1) are dissolved in 75 g of distilled methyl methacrylate, 0.5 g of azodiisobutyronitrile is added as polymerisation initiator and the liquid monomer mixture is poured into moulds. The crosslinking copolymerisation reaction is started at 55° C. in a heating cabinet. When an increase in viscosity is recorded in the contents of the moulds, the moulds are placed in a thermostatically controlled waterbath and their contents left to harden for 48 hours at 40° C. This is followed by post-hardening for 1 hour at 60° C., for 1 hour at 80° C. and for 2 hours at 120° C.

After mould release, 4 mm thick transparent water-clear panels with the following properties are obtained:

| | |
|---|---|
| flexural strength | 113 N/mm² |
| tensile strength | 96 N/mm² |
| impact strength | 6.7 KJ/m² |
| Vicat temperature | 121° C. |
| dimensional stability under heat | |
| according to Maretns | 112° C. |
| according to ISO/R 75; A | 123° C. |

By comparison, a panel of methyl methacrylate homopolymer produced by the same process has the following properties:

| | |
|---|---|
| flexural strength | 126 N/mm² |
| tensile strength | 76 N/mm² |
| impact strength | 11 KJ/m² |
| Vicat temperature | 114° C. |
| dimensional stability under heat | |
| according to Martens | 92° C. |
| according to ISO/R 75: A | 101° C. |

The 4 mm panel produced with the bis-methacrylic ester according to the invention as crosslinking component is self-extinguishing in a small-scale test (Bunsen burner), even after repeated ignition (it goes out after 5 seconds without dripping).

EXAMPLE 12

Bis-acrylic ester of formula (1) with X=bromine as crosslinking component of unsaturated polyester resin solutions.

50 parts by weight of an unsaturated polyester resin based on 0.5 mole of ethylene glycol, 0.5 mole of neopentyl glycol, 0.4 mole of phthalic acid anhydride and 0.6 mole of fumaric acid, with a molecular weight as determined by gel chromatography ($M_{GPC}$) of 2800, are dissolved in 50 parts by weight of styrene. The bis-acrylic ester of formula (1) with X=bromine is dissolved in the styrene solution in quantities of 10 and 20% by weight, based on the total quantity. After hardening (cold hardening with 2% by weight of 50% dibenzoyl peroxide paste+0.2% by volume of dimethyl aniline solution—10% in styrene) at 50° C., followed by post-hardening for 4 hours at 135° C., transparent, substantially colourless 4 mm panels with the following properties are obtained. The properties of hardened UP-resin solutions in styrene without the bis-acrylic ester added are shown for comparison.

| | UP-resin without addition | UP-resin bis-acrylic ester 90/10 | UP-resin bis-acrylic ester 80/20 |
|---|---|---|---|
| Tensile strength N/mm² | 41 | 48 | 57 |
| Ball indentation hardness, 30 secs N/mm² | 148 | 158 | 167 |
| Impact strength KJ/m² | 5.8 | 6.1 | 5.5 |
| Dimensional stability under heat | | | |
| according to Martens °C. | 95 | 109 | 117 |
| according to ISO/R 75; A °C. | 114 | 122 | 129 |

Addition of the bis-acrylic ester increases the tensile strength, ball indentation hardness and dimensional stability under heat of the powdered UP-resin without reducing its impact strength.

If 5% and 7% by weight of antimony trioxide are stirred into the UP-resin solutions containing the bis-acrylic ester according to the invention before hardening, the castings obtained are self-extinguishing in the UL-test; rating VO in the UL/94 test.

The 4,4'-bis-chloromethyl octahalogen diphenyl ethers used as starting materials can be prepared by side-chain chlorination of ar-octahalogen-p,p' ditolylethers, more closely being described in our copending application Ser. No. 709,058. Using nuclear halogenated ditolylethers of an average number of 7 to 8 halogen atoms, likewise bromine, chlorine or both, as starting material according to the examples of said Ser. No. 709,058 in quite corresponding manner bis-chloromethyl products result, having 7 to 8 halogen atoms substituted to both rings of diphenylether nucleus and up to 1 halogen being substituted to the rings.

This products form bis(meth)acrylates and corresponding polymers as described in the examples of the present application. The concentration of the alcali hydroxide solution of the examples may be from about 20 to about 90 wt.%.

What is claimed is:

1. A polymer containing basic units with the structural formula

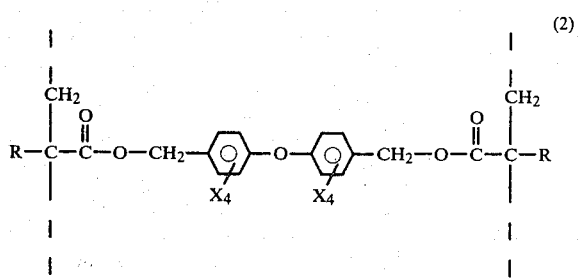

(2)

in which R represents hydrogen or a methyl group and of the 8X substituents 7X to 8X representing chlorine or bromine and up to 1X represents hydrogen.

2. A polymer of claim 1 wherein the unsaturated bis-ester of formula (1) represents about 40 to about 99.9% by weight of the recurring units.

3. A polymer of claim 1 wherein the unsaturated bis-ester of formula (1) represents about 70 to about 99.9% by weight of the recurring units.

4. A copolymer of claim 1 wherein the unsaturated bis-ester of formula (1) is copolymerized with an ethylenically unsaturated monomer.

5. A copolymer of claim 4 wherein the ethylenically unsaturated monomer is styrene, acrylonitrile, an acrylic or methacrylic acid ester, an unsubstituted, chlorine- or bromine-substituted benzyl acrylate or methacrylate, an unsubstituted, chlorine- or bromine-substituted xylene bis-acrylate or bis-methacrylate, butadiene, isoprene, fumaric or maleic acid or the anhydride or ester thereof, vinyl chloride or vinylidene chloride.

6. A copolymer of claim 4 wherein the ethylenically unsaturated monomer is styrene.

7. A copolymer of claim 4 which is a terpolymer.

8. A copolymer of claim 4 wherein several ethylenically unsaturated monomers are used to provide a terpolymer.

9. Plastic containing polymers claimed in claim 1 as flameproofing agents.

* * * * *